United States Patent Office 3,549,585
Patented Dec. 22, 1970

3,549,585
KAOLIN MODIFIED PLASTIC
MOLDING COMPOUNDS
David H. Solomon, Summit, N.J., assignor to Georgia
Kaolin Company, a corporation of New Jersey
No Drawing. Filed Mar. 28, 1969, Ser. No. 811,574
Int. Cl. C08g 51/04
U.S. Cl. 260—40                    4 Claims

ABSTRACT OF THE DISCLOSURE

A molding composition is provided comprising a neutralized kaolin in admixture with polyester resins.

---

This invention relates to kaolin modified plastic molding compounds and particularly to modified kaolins for improving stability in polyesters and alkyd molding compounds.

It has long been the desire of both the producers of kaolin and of polyester and alkyd resins to find some treatment for kaolin which would make it possible to add larger amounts of kaolin to such resins without detrimentally affecting their properties and hopefully with an improvement in at least one or more such properties. To this end various attempts have been made to make the normally hydrophilic kaolin become more organophilic. The efferots to accomplish this have been primarily directed to efforts to add organic salts to the kaolin surfaces to give them an organophilic nature. Typical of these efforts are those described in U.S. Pat. 2,999,080 to Wilcox, Pat. 3,032,431 to Ferrigino and Pat. 2,948,632 to Albert. None of these prior art proposals has been the complete answer to the problems of improving kaolins as fillers for organic polymers.

I have found a modified kaolin which not only has the desired properties of organophilicity but also stabilizes polyester and alkyd resins for storage and subsequent use as molding compounds.

I have discovered that neutralized kaolins (sometimes called predispersed kaolins) will stabilize unsaturated polyester molding powders so that they may be stored for subsequent use and may be added without the problems which occur with attempts to add normal kaolins.

The neutralized kaolins of this invention are prepared by treating an aqueous slurry of kaolin with an IN. solution of a salt. Among the salts used successfully are calcium chloride, sodium chloride and the polyphosphate salts of sodium such as sodium hexametaphosphate (Calgon), trisodium pyrophosphate and the like. The neutralized kaolins formed by using sodium polyphosphates are particularly interesting and useful and are preferred.

The invention can perhaps be best understood by reference to the following examples which illustrate the manner in which the invention is carried out.

EXAMPLE I

Preparation of sodium polyphosphate modified clay

The kaolin (100 g.) was added with stirring to water (200 ml.) in which was dissolved a sodium polyphosphate (4.0 g. of Calgon (sodium hexametaphosphate) was used). The treated mineral was isolated by spray-drying the slurry.

EXAMPLE II

Evaluation of clays in polyesters

The average particle size of the clay was 0.77µ.

The clays (40 g.) were dispersed in an unsaturated polyester resin (Selectron 5067, marketed by Pittsburgh Plate Glass Co.). The results were as follows:

| | Viscosity measurements [a] | |
|---|---|---|
| | Immediately after makeup, cps. | After standing 2 months at 25° C., cps. |
| Untreated clay | 16,000 | 18,000 |
| Sodium polyphosphate treated clay | 4,000 | 4,000 |

[a] These were carried out on a Brookfield Viscometer at 10 r.p.m. spindle No. 5.

To the polyester clay mixes was added cobalt naphthenate (equivalent to 0.06% cobalt metal per 100 g. of polyester resin) and methyl ethyl ketone peroxide (2.0 pts. per 100 gm. of polyester resin). The gel-times [1] of these compositions were:

Untreated clay composition—90 minutes; Polyphosphate treated clay composition—60 minutes.

The above results show clearly the faster curing given by the treated clay.

In addition the results show that a given viscosity it is possible to tolerate more of the treated clay in the polyester. This offers economic advantages because the clay is cheaper than the polyester. For example, at a viscosity of 16,000 cps. the compositions were:

(1) Untreated clay (40 pts.), polyester resin (60 pts.)
(2) Sodium polyphosphate treated clay (50 pts.), polyester resin (50 pts.).

The physical properties of polyester composites cured by adding 1% benzoyl peroxide to the mixture and heating for 12 minutes at 85° C. showed the modified or treated clay composite to be more flexible.

While I have described certain preferred practices and embodiments of my invention in the foregoing specification it will be understood that this invention may be otherwise embodied within the scope of the following claims.

---

[1] Measured on a Cambridge-Techne automatic gel timer.

I claim:
1. A molding composition comprising a kaolin neutralized with a member selected from the group consisting of calcium chloride, sodium chloride and the polyphosphate salts of sodium in admixture with a polyester resin.
2. A molding compound as claimed in claim 1 wherein the kaolin is neutralized with a sodium polyphosphate.
3. A molding compound as claimed in claim 1 wherein the kaolin is neutralized with sodium hexametaphosphate.
4. A molding compound as claimed in claim 1 wherein the polyester is an unsaturated polyester resin.

References Cited

UNITED STATES PATENTS

| 2,999,080 | 9/1961 | Wilcox | 260—40 |
| 3,085,080 | 4/1963 | Ferrigno | 260—40 |
| 3,161,618 | 12/1964 | Kreps et al. | 260—40X |
| 3,218,279 | 11/1965 | Stalego | 260—40X |
| 3,290,164 | 12/1966 | Ferrigno | 260—40X |
| 3,300,326 | 1/1967 | Ferrigno | 260—40X |
| 3,303,035 | 2/1967 | Hemstock et al. | 106—288X |
| 3,341,340 | 9/1967 | Sawyer et al. | 106—288X |

MORRIS LIEBMAN, Primary Examiner

L. T. JACOBS, Assistant Examiner